(12) United States Patent
Frederick et al.

(10) Patent No.: US 9,045,247 B2
(45) Date of Patent: Jun. 2, 2015

(54) POLYOLEFIN-BASED CONTAINERS

(75) Inventors: Thomas A. Frederick, Newark, DE (US); Claudio Cavalieri, Ferrara (IT); Jeanine A. Smith, Maineville, OH (US); Gilles Jobin, St. Lambert (CA); Timothy C. Brasel, Cincinnati, OH (US); Roberto Pantaleoni, Ferrara (IT); Marco Ciarafoni, Ferrara (IT); Paola Massari, Ferrara (IT)

(73) Assignee: Basell Poliolefine Italisa S.r.l., Milan (IT)

( * ) Notice: Subject to any disclaimer, the term of this patent is extended or adjusted under 35 U.S.C. 154(b) by 0 days.

(21) Appl. No.: 14/004,114

(22) PCT Filed: Mar. 8, 2012

(86) PCT No.: PCT/EP2012/053967
§ 371 (c)(1),
(2), (4) Date: Sep. 9, 2013

(87) PCT Pub. No.: WO2012/120069
PCT Pub. Date: Sep. 13, 2012

(65) Prior Publication Data
US 2013/0344267 A1     Dec. 26, 2013

Related U.S. Application Data

(60) Provisional application No. 61/451,436, filed on Mar. 10, 2011.

(51) Int. Cl.
*B65D 1/02* (2006.01)
*C08L 23/12* (2006.01)
*B29C 45/00* (2006.01)
*C08L 23/14* (2006.01)

(52) U.S. Cl.
CPC ........... *B65D 1/0207* (2013.01); *B29C 45/0001* (2013.01); *C08L 23/12* (2013.01); *C08L 23/14* (2013.01)

(58) Field of Classification Search
CPC ..................................................... B65D 1/0207
USPC ........... 428/35.2–35.5, 35.7–35.9, 36.4–36.8, 428/36.92
See application file for complete search history.

(56) References Cited

U.S. PATENT DOCUMENTS

2007/0197712 A1   8/2007   Fujiwara
2010/0152360 A1   6/2010   Jiang et al.

FOREIGN PATENT DOCUMENTS

EP   1935938 A1   6/2008

OTHER PUBLICATIONS

PCT International Search Report & Written Opinion mailed May 8, 2012, for PCT/EP2012/053967.

*Primary Examiner* — Walter B Aughenbaugh

(57) ABSTRACT

A container comprising a polyolefin composition comprising:
A) from 59 wt. % to 84 wt. %, based upon the total weight of the polyolefin composition, of a propylene homopolymer having isotactic pentads (mmmm) measured with $^{13}$C-NMR higher than 96%,
B) from 16 wt. % to 41 wt. %, based upon the total weight of the polyolefin composition, of a copolymer of propylene and ethylene, wherein the copolymer of propylene and ethylene comprises from 30 wt. % to 44 wt. %, of ethylene derived units based upon total weight of the copolymer of propylene and ethylene;
the sum A)+B) being 100 wt. %;
the polyolefin composition having an MFR L (Melt Flow Rate according to ISO 1133, condition L, i.e. 230° C. and 2.16 kg load) between 72 and 100 g/10 min.

7 Claims, No Drawings

1

POLYOLEFIN-BASED CONTAINERS

This application is the U.S. National Phase of PCT International Application PCT/EP2012/053967, filed Mar. 8, 2012, which claims benefit of priority under 35 U.S.C. 119(e) of U.S. Provisional Application No. 61/451,436 filed Mar. 10, 2011, the contents of which are incorporated herein by reference in their entirety.

FIELD OF THE INVENTION

The present invention relates to containers, particularly containers for food, that can be advantageously used for refrigerated or frozen food. The invention also relates to a process for producing such containers.

BACKGROUND OF THE INVENTION

Polyolefins are widely used to produce containers for food products. In particular, polypropylene heterophasic compositions, due to their impact resistance properties that extend at low temperatures, are known to be indicated for use in the production of containers for food products that can be frozen.

For Example US 2001/0017301 relates to a inner container that can be made by using a generic heterophasic copolymer.

Heterophasic polypropylene compositions are also known for other purposes. For example, WO 2006/037705 relates to an olefin polymer composition comprising (by weight, unless otherwise specified):
A) 60-85%, preferably 65-80%, more preferably 65-75%, of a crystalline propylene homopolymer or a crystalline copolymer of propylene containing 3% or less of ethylene or $C_4$-$C_{10}$ alpha-olefin(s) or of combinations thereof, said homopolymer or copolymer having a Polydispersity Index (P.I.) value of from 4.5-6, preferably 4.5-5.5, and a content of isotactic pentads (mmmm), measured by $^{13}C$ NMR on the fraction insoluble in xylene at 25° C., higher than 96%, preferably higher than 98%;
B) 15-40%, preferably 20-35%, more preferably 25-35%, of a partially amorphous copolymer of ethylene containing from 35% to 70%, preferably from 40 to 55%, of propylene or $C_4$-$C_{10}$ alpha-olefin(s) or of combinations thereof, and optionally minor proportions of a diene. Said olefin polymer composition exhibits a value of elongation at break ranging from 150 to 600%, preferably 200-500%, according to ISO method 527.

The composition described in this document is said to be fit for automotive applications in particular for bumpers.

WO 05/014713 relates to a heterophasic polyolefin composition comprising (percent by weight):
1) 65-95% of a crystalline propylene polymer selected from propylene homopolymer and random polymer of propylene with 0.1-10% of an a-olefin selected from ethylene, a $C_4$-$C_{10}$ alpha-olefin and a mixture thereof, the said polymer being insoluble in xylene at ambient temperature in an amount over 85% and having a polydispersity index ranging from 4 to 13, preferably 4.5 to 12, more preferably 5 to 9, and an intrinsic viscosity value over 2.2 dl/g, preferably 2.2 to 4.5 dl/g; and
2) 5-35% of an elastomeric olefin polymer of ethylene with a $C_3$-$C_{10}$ alpha-olefin and optionally a diene, having an ethylene content ranging from 15 to 85% and an intrinsic viscosity value of at least 1.4 dl/g, preferably from 2.5 to 5 dl/g.

The composition described in this document is particularly fit for the production of pipes.

WO 2004/087807 relates to a propylene polymer composition comprising (by weight, unless otherwise specified):
A) 60-95%, of a propylene homopolymer, or a copolymer of propylene containing 3% or less of ethylene or $C_4$-$C_{10}$ alpha-olefin(s) or of combinations thereof, said homopolymer or copolymer having a Polydispersity Index (P.I.) value of from 4.6 to 10, preferably from 5.1 to 8 and a content of isotactic pentads (mmmm), measured by $^{13}C$ NMR on the fraction insoluble in xylene at 25° C., higher than 98 molar %, preferably from 98.5 to 99.5 molar %;
B) 5-40%, preferably 10-35%, of a copolymer of ethylene containing from 40% to 70%, preferably from 47 to 62%, of propylene or $C_4$-$C_{10}$ alpha-olefin(s) or of combinations thereof, and optionally minor proportions of a diene; said composition having a Temperature Rising Elution Fractionation (TREF) profile, obtained by fractionation in xylene and collection of fractions at temperatures of 40° C., 80° C. and 90° C., in which the ethylene content Y of the fraction collected at 90° C. satisfies the following relation (I):

$$Y \leftarrow 0.8 + 0.035X + 0.0091X_2$$

wherein X is the ethylene content of the fraction collected at 40° C. and both X and Y are expressed in percent by weight (referred to the respective fractions), and having a value of intrinsic viscosity of the fraction soluble in xylene at 25° C. of from 1.8 to 4.2 dl/g, preferably from 2 to 4.2 dl/g, more preferably from 2.3 to 3.8. This composition has preferably a Melt Flow Rate (MFR) from 0.5 to 45 g/10 min., more preferably from 2 to 35 g/10 min. This document does not report possible use for the composition.

SUMMARY OF THE INVENTION

There is a need to provide improved containers, particularly food containers, and more particularly containers for frozen food, having an improved balance of properties in particular resistance to the impact and low hexane extractable.

DETAILED DESCRIPTION OF THE INVENTION

Thus an object of the present invention is a container, preferably a food container, more preferably a frozen food container comprising a polyolefin composition comprising:
A) from 59 wt. % to 84 wt. %, preferably from more than 67% to less than 81 wt. %, more preferably from more than 80 wt. % to less than 85 wt. %, of a propylene homopolymer having isotactic pentads (mmmm) measured with by $^{13}C$-NMR higher than 96%;
B) from 16 wt. % to 41 wt. %, preferably from more than 19% to less than 33 wt. %, more preferably from more than 20 wt. % to less than 25 wt. % of a copolymer of propylene and ethylene with from 30 wt. % to 44 wt. %, preferably more than 35 wt. % and less than 40 wt. %, more preferably from more than 36% and less than 39 wt. %; of ethylene derived units;
the sum A)+B) being 100;
the composition having an MFR L (Melt Flow Rate according to ISO 1133, condition L, i.e. 230° C. and 2.16 kg load) ranging from 72 to 100 g/10 min preferably from 73 to 92 g/10 min more preferably from 74 to 85 g/10 min.

For the purpose of the present invention the term "copolymer" includes polymers containing only two kinds of comonomers.

For the purpose of the present invention the term "container" means any kind of object able to contain liquid or solid matter. Generally said container have one or more bottom parts, at least three lateral walls and optionally one or more top parts. The lateral walls and the bottom and top part (when present) generally have a thickness ranging from 0.1 mm to 5 mm, preferably from 0.2 mm to 3 mm; more preferably from 0.3 mm to 2 mm. Examples are containers for ice cream, eggs, yoghurt, fish and frozen fish.

The MFR of the polyolefin composition to be used for obtaining the container object of the present invention can be obtained directly as ex-reactor polymer, i.e. the virgin polymer as produced in the reactor without treatment or by chemical degradation, i.e. visbreaking. When used, the said chemical degradation (visbreaking) can be carried out by treating the precursor propylene polymer with appropriate amounts, preferably from 0.001 to 0.20 wt. %, more preferably from 0.01 to 0.10 wt. % even more preferably from 0.01 to 0.05 wt. %, of free radical initiators according to processes well-known in the art. Preferably, the chemical degradation is carried out by contacting under high shear conditions the polymeric material with at least one free radical initiator at a temperature equal to or higher than the decomposition temperature of the free radical initiator. Preferred free radical initiators are peroxides having a decomposition temperature ranging from 150° to 250° C., such as di-tert-butyl peroxide, 1,1,4,4-tetramethyltetramethylene)bis(tert-butyl peroxide), dicumyl peroxide, the 2,5-dimethyl-2,5-di(tert-butylperoxy) hexyne, and 2,5-dimethyl-2,5-di(tert-butylperoxy)hexane.

When the polymer is visbroken the ratio $MFR^{II}/MFR^{I}$ ranges from 1.1 to 2.5; preferably from 1.2 to 1.9; more preferably from 1.3 to 1.7; wherein $MFR^{II}$ is the MFR of the final polymer and $MFR^{I}$ is the MFR of the precursor polymer, i.e. the MFR of the polymer before the visbreaking process.

The balancement of the various parameter such as ethylene content, split (amount of component A and B), and final MFR of the polyolefin composition allows to obtain containers having a high resistance to the impact especially at low temperature. Therefore the container according to the present invention is especial suitable to be used as container at low temperature especially for frozen food (i.e. from 0° C. to about −20° C.). In addition the polyolefin composition is endowed with very low hexane extractable making the container of the present invention especially suitable as food container, in particular frozen food container.

The polyolefin composition fit for the production of the container according to the present invention is preferably endowed with a flexural modulus ranging from 800 MPa to 1300 MPa preferably from 900 MPa and 1200 MPa. Furthermore the elongation at break of the polyolefin composition to be used for the container of the present invention is preferably very low. The elongation at break is comprised between 2% and 100%; preferably between 3% and 50%; more preferably between 4% and 20%. These values of elongation at break allow obtaining containers having the right rigidity with very tiny walls.

Preferably the polyolefin composition used for the container according to the present invention is endowed with hexane extractables lower than 6% by weight, preferably lower than 5% by weight.

The polyolefin composition to be used in the present invention can be prepared by sequential polymerization in at least two stages, with each subsequent polymerization stage being conducted in the presence of the polymeric material formed in the immediately preceding polymerization reaction, wherein the component (A) is normally prepared in at least one first polymerization stage and the component (B) is normally prepared in at least one second polymerization stage.

Each polymerization stage is carried out in presence of a highly stereospecific heterogeneous Ziegler-Natta catalyst. The Ziegler-Natta catalysts suitable for producing the propylene polymer compositions of the invention comprise a solid catalyst component comprising at least one titanium compound having at least one titanium-halogen bond and at least an electron-donor compound (internal donor), both supported on magnesium chloride. The Ziegler-Natta catalysts systems further comprise an organo-aluminum compound as essential co-catalyst and optionally an external electron-donor compound.

Suitable catalysts systems are described in the European patents EP45977, EP361494, EP728769, EP 1272533 and in the international patent application WO00163261.

Preferably, the solid catalyst component comprises Mg, Ti, halogen and phtalate as electron donor.

According to a preferred method, the solid catalyst component can be prepared by reacting a titanium compound of formula $Ti(OR)_{n-y}X_y$ where n is the valence of titanium and y is a number between 1 and n, X is an halogen atom, preferably chlorine, preferably TiC4, with a magnesium chloride deriving from an adduct of formula $MgCl_2 \cdot pROH$, where p is a number between 0.1 and 6, preferably from 2 to 3.5, and R is a hydrocarbon radical having 1-18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. Examples of spherical adducts prepared according to this procedure are described in U.S. Pat. No. 4,399,054 and U.S. Pat. No. 4,469,648. The so obtained adduct can be directly reacted with the Ti compound or it can be previously subjected to thermal controlled dealcoholation (80-130° C.) so as to obtain an adduct in which the number of moles of alcohol is generally lower than 3, preferably between 0.1 and 2.5. The reaction with the Ti compound can be carried out by suspending the adduct (dealcoholated or as such) in cold $TiCl_4$ (generally 0° C.); the mixture is heated up to 80-130° C. and kept at this temperature for 0.5-2 hours. The treatment with Tic4 can be carried out one or more times. The internal donor can be added during the treatment with $TiCl_4$ and the treatment with the electron donor compound can be repeated one or more times. Generally, the succinate of formula (I) is used in molar ratio with respect to the MgCl2 of from 0.01 to 1 preferably from 0.05 to 0.5. The preparation of catalyst components in spherical form is described for example in European patent application EP-A-395083 and in the International patent application WO98144001. The solid catalyst components obtained according to the above method show a surface area (by B.E.T. method) generally between 20 and 500 m21 g and preferably between 50 and 400 m21 g, and a total porosity (by B.E.T. method) higher than 0.2 cm31 g preferably between 0.2 and 0.6 cm31 g. The porosity (Hg method) due to pores with radius up to 10.000 Å generally ranges from 0.3 to 1.5 cm31 g, preferably from 0.45 to 1 cm31 g.

The organo-aluminum compound is preferably an alkyl-Al selected from the trialkyl aluminum compounds such as for example triethylaluminum, triisobutylaluminum, tri-n-butylaluminum, tri-n-hexylaluminum, tri-n-octylaluminum. It is also possible to use mixtures of trialkylaluminum's with alkylaluminum halides, alkylaluminum hydrides or alkylaluminum sesquichlorides such as $AlEt_2Cl$ and $Al_2Et_3Cl_3$.

Preferred external electron-donor compounds include silicon compounds, ethers, esters such as ethyl 4-ethoxybenzoate, amines, heterocyclic compounds and particularly 2,2, 6,6-tetramethyl piperidine, ketones and the 1,3-diethers. Another class of preferred external donor compounds is that of silicon compounds of formula $R_a^5R_b^6Si(OR^7)_c$ where a and b are integer from 0 to 2, c is an integer from 1 to 3 and the sum (a+b+c) is 4; $R^5$, $R^6$, and $R^7$, are alkyl, cycloalkyl or aryl radicals with 1-18 carbon atoms optionally containing heteroatoms. Particularly preferred are methylcyclohexyldimethoxysilane, diphenyldimethoxysilane, methyl-t-butyldimethoxysilane, dicyclopentyldimethoxysilane, 2-ethylpiperidinyl-2-t-butyldimethoxysilane and 1,1,1,trifluoropropyl-2-ethylpiperidinyl-dimethoxysilane and 1,1,1, trifluoropropyl-metildimethoxysilane. The external electron donor compound is used in such an amount to give a molar ratio between the organo-aluminum compound and said electron donor compound of from 0.1 to 500.

The polymerization process can be carried out in gas phase and/or in liquid phase, in continuous or batch reactors, such as fluidized bed or slurry reactors. For example, it is possible to carry out the polymerization of the propylene polymer (A) in liquid phase, using liquid propylene as diluent, while the copolymerization stage to obtain the propylene copolymer fraction (B) is carried out in gas phase, without intermediate stages except for the partial degassing of the monomers. Alternatively, all the sequential polymerization stages can be carried out in gas phase. The reaction time, temperature and pressure of the polymerization steps are not critical, however the temperature for the preparation of fraction (A) and (B), that can be the same or different, is usually from 50° C. to 120° C. The polymerization pressure preferably ranges from 0.5 to 12 MPa if the polymerization is carried out in gas-phase. The catalytic system can be pre-contacted (pre-polymerized) with small amounts of olefins. The molecular weight of the propylene polymer composition is regulated by using known regulators, such as hydrogen.

In the second stage of the particularly preferred polymerization process, the propylene/ethylene copolymer (B) is produced in a conventional fluidized-bed gas-phase reactor in the presence of the polymeric material and the catalyst system coming from the preceding polymerization step. The propylene polymer compositions of the present invention can also be obtained by separately preparing the said copolymers (A) and (B), operating with the same catalysts and substantially under the same polymerization conditions as previously illustrated and subsequently mechanically blending said copolymers in the molten state using conventional mixing apparatuses, like twin-screw extruders.

The polyolefin composition used for the containers of the present invention may further comprise additives commonly employed in the polyolefin field, such as antioxidants, light stabilizers, nucleating agents, antiacids, colorants and fillers.

According to another aspect, the present invention relates to a process for the preparation of a container, which process comprises injection moulding a polyolefin composition according to the present invention.

The following examples are given to illustrate and not to limit the present invention.

EXAMPLES

The data of the propylene polymer materials were obtained according to the following methods:
Xylene-Soluble Faction at 25° C. (XS)

2.5 g of polymer and 250 mL of o-xylene are introduced in a glass flask equipped with a refrigerator and a magnetical stirrer. The temperature is raised in 30 minutes up to the boiling pint of the solvent. The so obtained solution is then kept under reflux and stirring for further 30 minutes. The closed flask is then kept for 30 minutes in a bath of ice and water and in thermostatic water bath at 25° C. for 30 minutes as well. The solid thus obtained is filtered on quick filtering paper and the filtered liquid is divided into two 100 ml aliquots. One 100 ml aliquots of the filtered liquid is poured in a previously weighed aluminum container, which is heated on a heating plate under nitrogen flow, to remove the solvent by evaporation. The container is then kept on an oven at 80° C. under vacuum until constant weight is obtained. The residue is weighed to determine the percentage of xylene-soluble polymer.

Ethylene (C2) Content

Ethylene content has been determined by IR spectroscopy. The spectrum of a pressed film of the polymer is recorded in absorbance vs. wavenumbers (cm-1). The following measurements are used to calculate C2 content:

a) Area $(A_t)$ of the combination absorption bands between 4482 and 3950 cm$^{-1}$ which is used for spectrometric normalization of film thickness.

b) Area $(A_{C2})$ of the absorption band due to methylenic sequences ($CH_2$ rocking vibration) after a proper digital subtraction of an isotactic polypropylene (IPP) reference spectrum. The range 660 to 790 cm$^{-1}$ is used for both heterophasic and/or random copolymers.

The ethylene derived units content of component B) ahs been determined by calculation knowing the total ethylene content and the amount of component B)

NMR

The proton and carbon spectra of polymers were obtained using a Bruker DPX 400 spectrometer operating in the Fourier transform mode at 120° C. at 400.13 MHz and 100.61 MHz respectively. The samples were dissolved in C2D2Cl4. As reference the residual peak of C2DHCl4 in the 1H spectra (5.95 ppm) and the peak of the mmmm pentad in the 13C spectra (21.8 ppm) were used. Proton spectra were acquired with a 45° pulse and 5 seconds of delay between pulses; 256 transients were stored for each spectrum. The carbon spectra were acquired with a 90° pulse and 12 seconds (15 seconds for ethylene based polymers) of delay between pulses and CPD (waltz 16) to remove 1H-13C couplings. About 3000 transients were stored for each spectrum. mmmm pentads were calculated according to Randall, J. C. Polymer Sequence Determination; Academic Press: New York, 1977.

Molar Ratio of Feed Gasses
Determined by gas-chromatography
Melt Flow Rate (MFR)
Determined according to ISO 1133 (230° C., 2.16 Kg)
Intrinsic Viscosity
Determined in tetrahydronaphthalene at 135° C.
Flexural Modulus
Determined according to ISO 178
Stress at Yield and at Break
Determined according to ISO 527
Elongation at Yield and Break
Determined according to ISO 527
Container Impact Test (CIT)
Determined according to D2463–10b (2010)
Hexane Extractables The proportion of n-hexane-soluble material was determined by extraction using a modified FDA method. About 2.5 g of polymer granules were weighed out and suspended in 1 L of n-hexane. The suspension was heated to 50° C.±0.2° C. over a period of 20-25 minutes while stirring and stirred for a further 2 hours at this temperature. The suspension was filtered through a glass frit which had been preheated to 50° C. About 350 g of the filtrate were weighed into an evaporator flask which had previously been dried over P2O5 in a desiccator for 12 hours. The filtrate was evaporated to about 20-30 ml at 60° C. under reduced pressure on a rotary evaporator. The solution was transferred quantitatively with the aid of several rinses with warm hexane into a 200 ml evaporating basin which had previously been dried over P2O5 in a desiccator for 12 hours and weighed. The solution was evaporated to dryness on a hotplate while passing nitrogen over it. After evaporation, the evaporating basin was dried over P2O5 at 200 mbar in a desiccator for 12 hours, weighed and the extraction residue was determined. The same procedure was repeated without addition of polymer granules and the residue in pure n-hexane was determined. The residue in pure n-hexane was subtracted to determine the proportion of material which is extracted by n-hexane.

Polydispersity Index (PI):

measurement of molecular weight distribution of the polymer. To determine the PI value, the modulus separation at low modulus value, e.g. 500 Pa, is determined at a temperature of 200° C. by using a RMS-800 parallel plates rheometer model marketed by Rheometrics (USA), operating at an oscillation frequency which increases from 0.01 rad/second to 100 rad/second. From the modulus separation value, the PI can be derived using the following equation:

$$PI = 54.6 \times (\text{modulus separation}) - 1.76$$

wherein the modulus separation (MS) is defined as:

$$MS = (\text{frequency at } G' = 500 \text{ Pa})/(\text{frequency at } G'' = 500 \text{ Pa})$$

wherein G' is the storage modulus and G" is the loss modulus.

Example 1 and Comparative Examples 2-3

Catalyst System

The Ziegler-Natta catalyst was prepared according to the Example 5, lines 48-55 of the European Patent EP728769. Triethylaluminium (TEAL) was used as co-catalyst and dicyclopentyldimethoxysilane (DCPMS) as external donor, with the weight ratios indicated in Table 1.

Prepolymerization Treatment

Before introducing it into the polymerization reactors, the solid catalyst component described above is subjected to prepolymerization by maintaining it in suspension in liquid propylene at 20° C. for about 5 minutes before introducing it into the first polymerization reactor.

Polymerization

The polymerization run is conducted in continuous mode in a series of three reactors equipped with devices to transfer the product from one reactor to the one immediately next to it. The first two reactors are liquid phase reactors, and the third is a fluid bed gas phase reactor. Component (A) is prepared in the first and second reactor, while component (B) is prepared in the third.

Hydrogen is used as molecular weight regulator.

The gas phase (propylene, ethylene and hydrogen) is continuously analyzed via gas-chromatography.

At the end of the run the powder is discharged and dried under a nitrogen flow.

The main polymerization conditions are reported in Table 1

TABLE 1

|  |  | Ex. 1 | Comp ex 2 | Comp Ex 3 |
|---|---|---|---|---|
| TEAL/solid catalyst component weight ratio |  | 7 |  | 7 |
| TEAL/DCPMS weight ratio |  | 4 | 2.7 | 4 |
| Liquid phase reactors |  |  |  |  |
| Polymerisation temperature | ° C. | 70 |  | 70 |
| Pressure | Bar-g | 40 |  | 42 |
| Residence time | minutes | 90 |  | 70 |
| H2 bulk | molppl | 9300 | 7500 | 7300 |
| 1st gas phase reactor |  |  |  |  |
| Polymerisation temperature | ° C. | 80 | 75 | 80 |
| Pressure | Barg | 16 |  | 14 |
| Residence time | min | 18 |  | 20 |
| C2/(C2 + C3) | Mol ratio | 0.3 | 0.38 | 0.32 |
| H2/C2 | Mol ratio | 0.044 | 0.15 | 0.1 |

C2 = ethylene;
C3 = propylene;
H2 = hydrogen

The polyolefin composition of example 1 and comparative examples 2 and 3 have been extruded under nitrogen atmosphere in a twin screw extruder, at a rotation speed of 250 rpm and a melt temperature of 200-250° C. with the additives reported in table 2 and pelletized. The polymers features are reported in table 3

TABLE 2

|  |  | Ex 1 | Comp Ex 2 | Com Ex 3 |
|---|---|---|---|---|
| 1,1,4,4-Tetramethyltetramethylene) bis(tert-butyl peroxide) DHBP | Wt % | 0.01501 | 0.0120 | 0 |
| Glycerol Monostearate 90 | Wt % | 0.70000 | 0.70000 | 0.70000 |
| Irganox 1010 | Wt % | 0.07450 | 0.07450 | 0.07450 |
| Irgafoss 168 | Wt % | 0.07450 | 0.07450 | 0.07450 |
| Sodium benzoate 1 | Wt % | 0.11000 | 0.11000 | 0.11000 |

TABLE 3

|  |  | 2-2308 Example | Ep548u | Ep548s |
|---|---|---|---|---|
|  |  | ex 1 | Comp ex 2 | Comp ex 3 |
| Component a) |  |  |  |  |
| Homopolymer content | % | 77 | 81 | 80 |
| mmmm pentads | % | >96 | >96 | >96 |
| Component b) |  |  |  |  |
| Copolymer content | wt % | 23 | 17 | 17 |
| Ethylene content in component b) | wt % | 38 | 47 | 46 |
| Property of the composition |  |  |  |  |
| Ethylene content | wt % | 9 | 8 | 8 |
| MFR (before visbreaking)+ | g/10' | 50 | 41 | 39 |
| MFR (after visbreaking) | g/10' | 74 | 71 | 39 |
| Flexural Modulus | MPa | 1166 | 1395 | 1472 |
| Izod at 23° C. | KJ/m2 | 4.2 | 5.1 | 4.6 |
| Izod at −20° C. | KJ/m2 | 3.6 | 3.4 | 3.5 |
| Tens. Str.@ yield | MPa | 22.2 | 25.7 | 27.0 |
| Elong.@ break | % | 7.9 | 17 | 4.5 |
| Tens. Str.@ break | MPa | 21.3 | 23 | 25 |
| CIT @ 23° C.* | J | 16.0 | 16.3 | 6 |
| CIT @ 0° C.* | J | 19.7 | 13.9 | 3 |

TABLE 3-continued

|  |  | 2-2308 Example ex 1 | Ep548u Comp ex 2 | Ep548s Comp ex 3 |
| --- | --- | --- | --- | --- |
| CIT @ −20° C.* | J | 13.1 | 5.1 | 2.9 |
| Hexane extractables | % | 5.2 | nd | nd | determined

⁺measure on the polyolefin composition powder before the pellettization

*Cit has been measured on containers having a parallelepiped form with four walls and a bottom part obtained by injection moulding and having the wall and the bottom part 0.4 mm thin.

By comparing example 1 and comparative examples 2 and 3 it is possible to note that the containers of the present invention shows an higher CIT at 0 and −20° C. even if the IZOD at −20° C. of the respective polyolefin composition is comparable.

The invention claimed is:

1. A container comprising a polyolefin composition comprising:
   A) from 59 wt. % to 84 wt. %, based upon the total weight of the polyolefin composition, of a propylene homopolymer having isotactic pentads (mmmm) measured with $^{13}$C-NMR higher than 96%,
   B) from 16 wt. % to 41 wt. %, based upon the total weight of the polyolefin composition, of a copolymer of propylene and ethylene, wherein the copolymer of propylene and ethylene comprises from 30 wt. % to 44 wt. %, of ethylene derived units based upon total weight of the copolymer of propylene and ethylene;
   the sum A)+B) being 100 wt. %;
   the polyolefin composition having an MFR L (Melt Flow Rate according to ISO 1133, condition L, i.e. 230° C. and 2.16 kg load) between 72 and 100 g/10 min.

2. The container according to claim 1, wherein the container is a food container.

3. The container according to claim 1, wherein the polyolefin composition comprises:
   A) from more than 67 wt. % to less than 81 wt. %, of the propylene homopolymer;
   B) from more than 19 wt. % to less than 33 wt. %, of the copolymer of propylene and ethylene.

4. The container according to claim 1, wherein the polyolefin composition component B) contains more than 35 wt. % and less than 40 wt. %, of ethylene derived units.

5. The container according to claim 1, wherein the polyolefin composition component B) contains from more than 36 wt. % and less than 39 wt. % of ethylene derived units.

6. The container according to claim 1 wherein the polyolefin composition has MFR L (Melt Flow Rate according to ISO 1133, condition L, i.e. 230° C. and 2.16 kg load) between 73 and 92 g/10 min.

7. A process comprising, preparing a container with an injection moulding, wherein the container comprises a polyolefin composition comprising:
   A) from 59 wt. % to 84 wt. %, based upon the total weight of the polyolefin composition, of a propylene homopolymer having isotactic pentads (mmmm) measured with $^{13}$C-NMR higher than 96%,
   B) from 16 wt. % to 41 wt. %, based upon the total weight of the polyolefin composition, of a copolymer of propylene and ethylene, wherein the copolymer of propylene and ethylene comprises from 30 wt. % to 44 wt. %, of ethylene derived units based upon total weight of the copolymer of propylene and ethylene;
   the sum A)+B) being 100 wt. %;
   the polyolefin composition having an MFR L (Melt Flow Rate according to ISO 1133, condition L, i.e. 230° C. and 2.16 kg load) between 72 and 100 g/10 min.

* * * * *